(12) United States Patent
Burkhardt et al.

(10) Patent No.: US 11,476,502 B2
(45) Date of Patent: Oct. 18, 2022

(54) NONAQUEOUS ELECTROLYTE COMPOSITIONS COMPRISING CYCLIC CARBONATE AND NON-FLUORINATED ACYCLIC CARBONATE

(71) Applicant: SOLVAY SA, Brussels (BE)

(72) Inventors: Stephen E. Burkhardt, Wilmington, DE (US); Jun J. Liu, Wilmington, DE (US); Sang-Hwan Kim, Wilmington, DE (US); Kostantinos Kourtakis, Media, PA (US)

(73) Assignee: Solvay SA, Brussels (BE)

( * ) Notice: Subject to any disclaimer, the term of this patent is extended or adjusted under 35 U.S.C. 154(b) by 106 days.

(21) Appl. No.: 16/317,918

(22) PCT Filed: Jul. 6, 2017

(86) PCT No.: PCT/EP2017/067009
§ 371 (c)(1),
(2) Date: Jan. 15, 2019

(87) PCT Pub. No.: WO2018/011062
PCT Pub. Date: Jan. 18, 2018

(65) Prior Publication Data
US 2019/0296398 A1    Sep. 26, 2019

Related U.S. Application Data

(60) Provisional application No. 62/362,626, filed on Jul. 15, 2016.

(51) Int. Cl.
| | |
|---|---|
| *H01M 10/0569* | (2010.01) |
| *H01M 4/131* | (2010.01) |
| *H01M 10/0525* | (2010.01) |
| *H01M 10/0568* | (2010.01) |
| *H01M 10/0567* | (2010.01) |
| *H01M 10/052* | (2010.01) |
| *H01M 4/02* | (2006.01) |

(52) U.S. Cl.
CPC ....... *H01M 10/0569* (2013.01); *H01M 4/131* (2013.01); *H01M 10/052* (2013.01); *H01M 10/0525* (2013.01); *H01M 10/0567* (2013.01); *H01M 10/0568* (2013.01); *H01M 2004/028* (2013.01); *H01M 2300/004* (2013.01); *H01M 2300/0034* (2013.01); *H01M 2300/0042* (2013.01)

(58) Field of Classification Search
CPC .......... H01M 10/0569; H01M 10/052; H01M 10/0525; H01M 10/0567; H01M 10/0568; H01M 4/131
See application file for complete search history.

(56) References Cited

U.S. PATENT DOCUMENTS

| | | | |
|---|---|---|---|
| 2004/0202941 A1* | 10/2004 | Ugawa | H01M 10/0525 429/332 |
| 2007/0178379 A1 | 8/2007 | Tamura et al. | |
| 2009/0226808 A1* | 9/2009 | Hiwara | H01M 10/0569 429/200 |
| 2009/0253044 A1 | 10/2009 | Nogi et al. | |
| 2013/0266847 A1* | 10/2013 | Noguchi | H01M 4/525 429/163 |
| 2014/0017572 A1 | 1/2014 | Uehara et al. | |
| 2014/0141313 A1* | 5/2014 | Takase | H01M 2/1673 429/144 |

FOREIGN PATENT DOCUMENTS

WO          16025589 A1   2/2016

\* cited by examiner

*Primary Examiner* — Jimmy Vo
(74) *Attorney, Agent, or Firm* — Osha Bergman Watanabe & Burton LLP

(57) ABSTRACT

Disclosed herein are electrolyte compositions comprising: a) a first solvent comprising a cyclic carbonate; b) a second solvent comprising a non-fluorinated acyclic carbonate; c) at least one electrolyte component selected from: i) a fluorinated acyclic carboxylic acid ester; ii) a fluorinated acyclic carbonate; iii) a fluorinated acyclic ether; or iv) a mixture thereof; and d) an electrolyte salt; wherein the electrolyte component is present in the electrolyte composition in the range of from about 0.05 weight percent to about 10 weight percent, based on the total weight of the first and second solvents.

24 Claims, No Drawings

NONAQUEOUS ELECTROLYTE COMPOSITIONS COMPRISING CYCLIC CARBONATE AND NON-FLUORINATED ACYCLIC CARBONATE

This application is a U.S. national phase entry under 35 U.S.C. § 371 of International Application No. PCT/EP2017/067009, filed on Jul. 6, 2017, which claims priority to U.S. Provisional Application No. 62/362,626, filed on Jul. 15, 2016. The entire contents of these applications are explicitly incorporated herein by this reference.

FIELD OF DISCLOSURE

The disclosure herein relates to non-aqueous electrolyte compositions comprising at least one electrolyte component selected from i) a fluorinated acyclic carboxylic acid ester, ii) a fluorinated acyclic carbonate, iii) a fluorinated acyclic ether, or iv) a mixture thereof. The electrolyte component is present in an amount of from about 0.05 weight percent to about 10 weight percent, based on the total weight of the electrolyte composition. The electrolyte compositions are useful in electrochemical cells, such as lithium ion batteries.

BACKGROUND

Batteries containing electrodes made from alkali metals, alkaline earth metals, or compounds comprising these metals—for example lithium ion batteries—typically incorporate electrolytes, additives and non-aqueous solvents for the electrolytes used in the batteries. Additives can enhance the performance and safety of the battery, and therefore a suitable solvent must dissolve the electrolyte as well as the additives. The solvent must also be stable under the conditions prevalent in an active battery system.

Electrolyte solvents used in lithium ion batteries typically incorporate organic carbonate compounds or mixtures, and typically include one or more linear carbonates such as, for example, ethyl methyl carbonate, dimethyl carbonate, or diethyl carbonate. Cyclic carbonates, such as ethylene carbonate, can also be included. However, at cathode potentials above about 4.35 V these electrolyte solvents can decompose, which can result in a loss of battery performance.

Various approaches have been investigated to overcome the limitations of commonly used non-aqueous electrolyte solvents. Although these electrolyte solvents can be used in lithium ion batteries having high cathode potentials, specifically at voltages greater than about 4.35 V, such as $LiCoO_2$ or $LiNi_xMn_yCo_zO_2$ where x+y+z is about 1, cycling performance—that is, the ability to efficiently discharge and charge the battery to full capacity multiple times—can be limited.

A need remains for electrolyte solvent formulations that will have improved performance when used in a lithium ion battery, particularly such a battery that operates with a high cathode potential (from about 4.1 up to about 5 V).

SUMMARY

In one aspect, there is provided an electrolyte composition comprising:
  a) a first solvent comprising a cyclic carbonate;
  b) a second solvent comprising a non-fluorinated acyclic carbonate;
  c) at least one electrolyte component selected from
    i) a fluorinated acyclic carboxylic acid ester;
    ii) a fluorinated acyclic carbonate;
    iii) a fluorinated acyclic ether; or
    iv) a mixture thereof; and
  d) an electrolyte salt;
wherein the electrolyte component is present in the electrolyte composition at an amount of from about 0.05 weight percent to about 10 weight percent, based on the total weight of the first and second solvents.

In some embodiments, the electrolyte component is present in the electrolyte composition in the range of from about 0.05 weight percent to about 5 weight percent, based on the total weight of the first and second solvents.

In another embodiment, the first solvent comprising a cyclic carbonate is optionally present. In another embodiment, the first solvent is not present in the electrolyte composition, and the electrolyte component is present in the electrolyte composition at an amount of from about 0.05 weight percent to about 10 weight percent, based on the total weight of the second solvent.

In another embodiment, there is provided herein an electrochemical cell comprising an electrolyte composition as disclosed herein. In another embodiment, the electrochemical cell is a lithium ion battery.

Other aspects of the disclosed invention may be inherent or understood from the disclosure provided herein even though not specifically described with particularity or completely embodied in a single example of this application, but which may nonetheless be synthesized by one of ordinary skill in the art from the totality of the description, the examples, and the claims provided in the present application, that is, the whole of this specification.

As used above and throughout the disclosure, the following terms, unless otherwise indicated, shall be defined as follows:

The term "electrolyte composition" as used herein, refers to a chemical composition that includes—at a minimum—a solvent for an electrolyte salt and an electrolyte salt, wherein the composition is capable of supplying an electrolyte in an electrochemical cell. An electrolyte composition can include other components, for example additives to enhance the performance of the battery in safety, reliability, and or efficiency.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

An "electrolyte solvent" as defined herein is a solvent or a solvent mixture for an electrolyte composition that comprises a fluorinated solvent.

The term "anode" refers to the electrode of an electrochemical cell, at which oxidation occurs. In a secondary (i.e. rechargeable) battery, the anode is the electrode at which oxidation occurs during discharge and reduction occurs during charging.

The term "cathode" refers to the electrode of an electrochemical cell, at which reduction occurs. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

The equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

An energy storage device is a device that is designed to provide electrical energy on demand, such as a battery or a capacitor. Energy storage devices contemplated herein at least in part provide energy from electrochemical sources.

The term "SEI", as used herein, refers to a solid electrolyte interphase layer formed on the active material of an electrode. A lithium-ion secondary electrochemical cell is assembled in an uncharged state and must be charged (a process called formation) for use. During the first few charging events (battery formation) of a lithium-ion secondary electrochemical cell, components of the electrolyte are reduced or otherwise decomposed or incorporated onto the surface of the negative active material and oxidized or otherwise decomposed or incorporated onto the surface of the positive active material, electrochemically forming a solid-electrolyte interphase on the active materials. These layers, which are electrically insulating but ionically conducting, help prevent decomposition of the electrolyte and can extend the cycle life and improve the performance of the battery. On the anode, the SEI can suppress the reductive decomposition of the electrolyte; on the cathode, the SEI can suppress the oxidation of the electrolyte components.

The term "alkyl group", as used herein, refers to linear, branched, and cyclic hydrocarbon groups containing from 1 to 20 carbons and containing no unsaturation. Examples of straight chain alkyl radicals include methyl, ethyl, propyl, butyl, pentyl, hexyl, heptyl, octyl, nonyl, decyl, undecyl, and dodecyl. Examples of branched chain isomers of straight chain alkyl groups include isopropyl, iso-butyl, tert-butyl, sec-butyl, isopentyl, neopentyl, isohexyl, neohexyl, and isooctyl. Examples of cyclic alkyl groups include cyclopropyl, cyclobutyl, cyclopentyl, cyclohexyl, cycloheptyl, and cyclooctyl.

The term "fluoroalkyl group", as used herein, refers to an alkyl group wherein at least one hydrogen is replaced by fluorine.

The term "carbonate" as used herein refers specifically to an organic carbonate, wherein the organic carbonate is a dialkyl diester derivative of carbonic acid, the organic carbonate having a general formula $R^a OCOOR^b$, wherein $R^a$ and $R^b$ are each independently selected from alkyl groups having at least one carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

Disclosed herein are electrolyte compositions comprising a first solvent; a second solvent; at least one electrolyte component selected from i) a fluorinated acyclic carboxylic acid ester, ii) a fluorinated acyclic carbonate, iii) a fluorinated acyclic ether, or iv) a mixture thereof; and an electrolyte salt. The first solvent comprises a cyclic carbonate. The second solvent comprises a non-fluorinated acyclic carbonate. The electrolyte component is present in the electrolyte composition at an amount of from about 0.05 weight percent to about 10 weight percent, based on the total weight of the first and second solvents. By "electrolyte component" is meant a constituent of an electrolyte composition which may function as an electrolyte solvent, as an electrolyte additive which can modify the SEI on at least one electrode, or as both an electrolyte solvent and an electrolyte additive, depending on its concentration in the electrolyte composition.

Also disclosed herein are electrolyte compositions comprising:
  a) optionally, a first solvent comprising a cyclic carbonate;
  b) a second solvent comprising a non-fluorinated acyclic carbonate;
  c) at least one electrolyte component selected from
    i) a fluorinated acyclic carboxylic acid ester;
    ii) a fluorinated acyclic carbonate;
    iii) a fluorinated acyclic ether; or
    iv) a mixture thereof; and
  d) an electrolyte salt;
wherein the electrolyte component is present in the electrolyte composition at an amount of from about 0.05 weight percent to about 10 weight percent, based on the total weight of the first and second solvents.

Also disclosed herein are electrolyte compositions comprising:
  a) a solvent comprising a non-fluorinated acyclic carbonate;
  b) at least one electrolyte component selected from
    i) a fluorinated acyclic carboxylic acid ester;
    ii) a fluorinated acyclic carbonate;
    iii) a fluorinated acyclic ether; or
    iv) a mixture thereof; and
  c) an electrolyte salt;
wherein the electrolyte component is present in the electrolyte composition at an amount of from about 0.05 weight percent to about 10 weight percent, based on the total weight of the solvent.

The first solvent comprises a cyclic carbonate. One or more cyclic carbonates can be used. The cyclic carbonate can be fluorinated or non-fluorinated. Suitable cyclic carbonates include, for example, ethylene carbonate; propylene carbonate; vinylene carbonate; vinyl ethylene carbonate; dimethylvinylene carbonate; ethyl propyl vinylene carbonate; 4-fluoroethylene carbonate; 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; tetrafluoroethylene carbonate; and mixtures thereof. 4-Fluoroethylene carbonate is also known as 4-fluoro-1,3-dioxolan-2-one or fluoroethylene carbonate. In one embodiment, the cyclic carbonate comprises ethylene carbonate; propylene carbonate; vinylene carbonate; vinyl ethylene carbonate; dimethylvinylene carbonate; ethyl propyl vinylene carbonate; 4-fluoroethylene carbonate; 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; or 4,4,5-trifluoro-1,3-dioxolan-2-one. In one embodiment, the cyclic carbonate comprises ethylene carbonate. In one embodiment, the cyclic carbonate comprises propylene carbonate. In one embodiment, the cyclic carbonate comprises fluoroethylene carbonate. In one embodiment, the cyclic carbonate comprises vinylene carbonate. It is desirable to use as a first solvent a cyclic carbonate that is battery grade in purity, or has a purity level of at least about 99.9%, and more particularly at least about 99.99%. Such cyclic carbonates are typically commercially available.

In the electrolyte compositions disclosed herein, the first solvent can be used in various amounts depending on the desired properties of the electrolyte composition. In one embodiment, the first solvent is present in the electrolyte composition in the range of from about 1 percent by weight to about 40 percent by weight, based on the total weight of the first and second solvents. In other embodiments, the first solvent is present in the electrolyte composition in a percentage by weight range that is defined by a lower limit and an upper limit. The lower limit of the range is 1, 2, 3, 4, 5, 6, 7, 8, 9, 10, 11, 12, 13, 14, 15, 16, 17, 18, 19, or 20 and the upper limit of the range is 21, 22, 23, 24, 25, 26, 27, 28, 29, 30, 31, 32, 33, 34, 35, 36, 37, 38, 39, or 40. All percentages by weight are based on the total weight of the first and second solvents.

The second solvent comprises a non-fluorinated acyclic carbonate. One or more non-fluorinated acyclic carbonates can be used. Suitable non-fluorinated acyclic carbonates include, for example, dimethyl carbonate, diethyl carbonate, dipropyl carbonate, dibutyl carbonate, di-tert-butyl carbonate, ethyl methyl carbonate, methyl propyl carbonate, methyl butyl carbonate, ethyl propyl carbonate, ethyl butyl carbonate, propyl butyl carbonate, or mixtures thereof. In one embodiment, the non-fluorinated acyclic carbonate comprises dimethyl carbonate, diethyl carbonate, dipropyl carbonate, dibutyl carbonate, or ethyl methyl carbonate. In one embodiment, the non-fluorinated acyclic carbonate comprises dimethyl carbonate. In one embodiment, the non-fluorinated acyclic carbonate comprises diethyl carbonate. In one embodiment, the non-fluorinated acyclic carbonate comprises ethyl methyl carbonate. It is desirable to use as a second solvent a non-fluorinated acyclic carbonate that is battery grade in purity, or has a purity level of at least about 99.9%, and more particularly at least about 99.99%. Such non-fluorinated acyclic carbonates are typically commercially available.

In the electrolyte compositions disclosed herein, the second solvent can be used in various amounts depending on the desired properties of the electrolyte composition. In one embodiment, the second solvent is present in the electrolyte composition in the range of from about 60 percent by weight to about 99 percent by weight, based on the total weight of the first and second solvents. In other embodiments, the second solvent is present in the electrolyte composition in a percentage by weight range that is defined by a lower limit and an upper limit. The lower limit of the range is 60, 61, 62, 63, 64, 65, 66, 67, 68, 69, 70, 71, 72, 73, 74, 75, 76, 77, 78, 79, or 80 and the upper limit of the range is 81, 82, 83, 84, 85, 86, 87, 88, 89, 90, 91, 92, 93, 94, 95, 96, 97, 98, or 99. All percentages by weight are based on the total weight of the first and second solvents.

The electrolyte compositions disclosed herein also comprise at least one electrolyte component selected from a fluorinated acyclic carboxylic acid ester, a fluorinated acyclic carbonate, a fluorinated acyclic ether, or a mixture thereof. In one embodiment, the electrolyte component is present in the electrolyte composition in the range of from about 0.05 weight percent to about 10 weight percent, based on the total weight of the first and second solvents. In one embodiment, the electrolyte component is present in the electrolyte composition in the range of from about 0.05 weight percent to about 5 weight percent, based on the total weight of the first and second solvents. In other embodiments, the electrolyte component is present in the electrolyte composition in a percentage by weight range that is defined by a lower limit and an upper limit. The lower limit of the range is 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 and the upper limit of the range is 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10. All percentages by weight are based on the total weight of the first and second solvents.

Without being bound by any theory, it is thought that the use of electrolyte components as disclosed herein in the electrolyte compositions disclosed herein can, after electrochemical cycling, modify the composition of the solid electrolyte interphase (SEI) layer formed on the active material of an electrode. This modification may have a beneficial impact on the performance of the battery and its cycle life durability.

In one embodiment, the at least one electrolyte component is a fluorinated acyclic carboxylic acid ester represented by the formula:

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

In one embodiment, $R^1$ is H and $R^2$ is a fluoroalkyl group. In one embodiment, $R^1$ is an alkyl group and $R^2$ is a fluoroalkyl group. In one embodiment, $R^1$ is a fluoroalkyl group and $R^2$ is an alkyl group. In one embodiment, $R^1$ is a fluoroalkyl group and $R^2$ is a fluoroalkyl group, and $R^1$ and $R^2$ can be either the same as or different from each other. In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

In one embodiment, the number of carbon atoms in $R^1$ in the formula above is 1, 3, 4, or 5.

In another embodiment, the number of carbon atoms in $R^1$ in the formula above is 1.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $F_2CHCH_2$—COO—$CH_3$, $F_2CHCH_2$—COO—$CH_2CH_3$, and $F_2CHCH_2CH_2$—COO—$CH_2CH_3$ (ethyl 4,4-difluorobutanoate, CAS No. 1240725-43-2), H—COO—$CH_2CF_2H$ (difluoroethyl formate, CAS No. 1137875-58-1), H—COO—$CH_2CF_3$ (trifluoroethyl formate, CAS No. 32042-38-9), and mixtures thereof. In one embodiment, the fluorinated acyclic carboxylic acid ester comprises 2,2-difluoroethyl acetate ($CH_3$—COO—$CH_2CF_2H$). In one embodiment, the fluorinated acyclic carboxylic acid ester comprises 2,2-difluoroethyl propionate ($CH_3CH_2$—COO—$CH_2CF_2H$). In one embodiment, the fluorinated acyclic carboxylic acid ester comprises 2,2,2-trifluoroethyl acetate ($CH_3$—COO—$CH_2CF_3$). In one embodiment, the fluorinated acyclic carboxylic acid ester comprises 2,2-difluoroethyl formate (H—COO—CH$_2$CF$_2$H).

In one embodiment, the fluorinated acyclic carboxylic acid ester comprises CH$_3$—COO—CH$_2$CF$_2$H, and the electrolyte composition further comprises lithium bis(oxalato)borate, ethylene sulfate, and maleic anhydride.

In another embodiment, the at least one electrolyte component is a fluorinated acyclic carbonate represented by the formula $$R^3\text{—OCOO—}R^4$$

wherein
i) $R^3$ is a fluoroalkyl group;
ii) $R^4$ is an alkyl group or a fluoroalkyl group; and
iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a FCH$_2$— group or a —FCH— group.

Examples of suitable fluorinated acyclic carbonates include without limitation CH$_3$—OC(O)O—CH$_2$CF$_2$H (methyl 2,2-difluoroethyl carbonate, CAS No. 916678-13-2), CH$_3$—OC(O)O—CH$_2$CF$_3$ (methyl 2,2,2-trifluoroethyl carbonate, CAS No. 156783-95-8), CH$_3$—OC(O)O—CH$_2$CF$_2$CF$_2$H (methyl 2,2,3,3-tetrafluoropropyl carbonate, CAS No. 156783-98-1), HCF$_2$CH$_2$—OCOO—CH$_2$CH$_3$ (ethyl 2,2-difluoroethyl carbonate, CAS No. 916678-14-3), and CF$_3$CH$_2$—OCOO—CH$_2$CH$_3$ (ethyl 2,2,2-trifluoroethyl carbonate, CAS No. 156783-96-9).

In another embodiment, the at least one electrolyte component is a fluorinated acyclic ether represented by the formula $$R^5\text{—O—}R^6$$

wherein
i) $R^5$ is a fluoroalkyl group;
ii) $R^6$ is an alkyl group or a fluoroalkyl group; and
iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a FCH$_2$— group or a —FCH— group.

Examples of suitable fluorinated acyclic ethers include without limitation HCF$_2$CF$_2$CH$_2$—O—CF$_2$CF$_2$H (CAS No. 16627-68-2) and HCF$_2$CH$_2$—O—CF$_2$CF$_2$H (CAS No. 50807-77-7).

In another embodiment, the electrolyte component is a mixture comprising a fluorinated acyclic carboxylic acid ester, a fluorinated acyclic carbonate, and/or a fluorinated acyclic ether. As used herein, the term "a mixture thereof" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate; and a mixture of 2,2-difluoroethyl acetate and 2,2 difluoroethyl methyl carbonate.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of HCF$_2$CF$_2$CH$_2$—O—CF$_2$CF$_2$H can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields HCF$_2$CH$_2$—O—CF$_2$CF$_2$H. Alternatively, some of these fluorinated electrolyte components may be obtained commercially. It is desirable to purify the electrolyte component to a purity level of at least about 99.9%, more particularly at least about 99.99%, for use in an electrolyte composition. Purification may be performed using distillation methods such as vacuum distillation or spinning band distillation.

The electrolyte compositions disclosed herein also comprise an electrolyte salt. Suitable electrolyte salts include without limitation:

lithium hexafluorophosphate (LiPF$_6$),
lithium bis(trifluoromethyl)tetrafluorophosphate (LiPF$_4$(CF$_3$)$_2$),
lithium bis(pentafluoroethyl)tetrafluorophosphate (LiPF$_4$(C$_2$F$_5$)$_2$),
lithium tris(pentafluoroethyl)trifluorophosphate (LiPF$_3$(C$_2$F$_5$)$_3$),
lithium bis(trifluoromethanesulfonyl)imide,
lithium bis(perfluoroethanesulfonyl)imide,
lithium (fluorosulfonyl) (nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
Li$_2$B$_{12}$F$_{12-x}$H$_x$ where x is equal to 0 to 8, and
mixtures of lithium fluoride and anion receptors such as B(OC$_6$F$_5$)$_3$.

Mixtures of two or more of these or comparable electrolyte salts may also be used. In one embodiment, the electrolyte salt comprises lithium bis(trifluoromethanesulfonyl)imide. In one embodiment, the electrolyte salt comprises lithium hexafluorophosphate. The electrolyte salt can be present in the electrolyte composition in an amount from about 0.2 M to about 2.0 M, for example from about 0.3 M to about 1.7 M, or for example from about 0.5 M to about 1.2 M, or for example 0.5 M to about 1.7M.

Optionally, an electrolyte composition as described herein may further comprise an additive selected from a lithium boron compound, a cyclic sultone, a cyclic sulfate, a cyclic carboxylic acid anhydride, or a combination thereof. In some embodiments, the electrolyte composition further comprises an additive selected from a lithium boron compound, a cyclic sultone, a cyclic sulfate, a cyclic carboxylic acid anhydride, or a combination thereof, and the electrolyte component comprises a fluorinated acyclic carboxylic acid ester represented by the formula:

$R^1-COO-R^2$, wherein i) $R^1$ is H, an alkyl group, or a fluoroalkyl group;
ii) $R^2$ is an alkyl group or a fluoroalkyl group;
iv) either or both of $R^1$ and $R^2$ comprises fluorine; and
v) $R^1$ and $R^2$, taken as a pair, comprise at least two carbon atoms but not more than seven carbon atoms. In some embodiments, the fluorinated acyclic carboxylic acid ester comprises $CH_3-COO-CH_2CF_2H$.

In some embodiments, the electrolyte composition further comprises a lithium boron compound. Suitable lithium boron compounds include lithium tetrafluoroborate, lithium bis(oxalato)borate, lithium difluoro(oxalato)borate, other lithium boron salts, $Li_2B_{12}F_{12-x}H_x$, wherein x is 0 to 8, mixtures of lithium fluoride and anion receptors such as $B(OC_6F_5)_3$, or mixtures thereof. In one embodiment, the electrolyte composition additionally comprises at least one lithium borate salt selected from lithium bis(oxalato)borate, lithium difluoro(oxalato)borate, lithium tetrafluoroborate, or mixtures thereof. In some embodiments, the electrolyte composition comprises lithium bis(oxalato)borate. In some embodiments, the electrolyte composition comprises lithium difluoro(oxalato)borate. In some embodiments, the electrolyte composition comprises lithium tetrafluoroborate. The lithium borate salt may be present in the electrolyte composition in the range of from 0.1 to about 10 percent by weight, based on the total weight of the electrolyte composition, for example in the range of from 0.1 to about 5.0 percent by weight, or from 0.3 to about 4.0 percent by weight, or from 0.5 to 2.0 percent by weight. The lithium boron compounds can be obtained commercially or prepared by methods known in the art.

In some embodiments, the electrolyte composition further comprises a cyclic sultone. Suitable sultones include those represented by the formula:

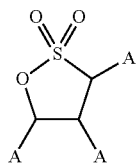

wherein each A is independently a hydrogen, fluorine, or an optionally fluorinated alkyl, vinyl, allyl, acetylenic, or propargyl group. The vinyl ($H_2C=CH-$), allyl ($H_2C=CH-CH_2-$), acetylenic ($HC\equiv C-$), or propargyl ($HC\equiv C-CH_2-$) groups may each be unsubstituted or partially or totally fluorinated. Each A can be the same or different as one or more of the other A groups, and two or three of the A groups can together form a ring. Mixtures of two or more of sultones may also be used. Suitable sultones include 1,3-propane sultone, 3-fluoro-1,3-propane sultone, 4-fluoro-1,3-propane sultone, 5-fluoro-1,3-propane sultone, and 1,8-naphthalenesultone. In one embodiment, the sultone comprises 1,3-propane sultone. In one embodiment, the sultone comprises 3-fluoro-1,3-propane sultone.

In one embodiment, the sultone is present at about 0.01 to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, of the total electrolyte composition.

In some embodiments, the electrolyte composition further comprises a cyclic sulfate represented by the formula:

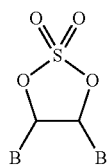

wherein each B is independently a hydrogen or an optionally fluorinated vinyl, allyl, acetylenic, propargyl, or $C_1$-$C_3$ alkyl group. The vinyl ($H_2C=CH-$), allyl ($H_2C=CH-CH_2-$), acetylenic ($HC\equiv C-$), propargyl ($HC\equiv C-CH_2-$), or $C_1$-$C_3$ alkyl groups may each be unsubstituted or partially or totally fluorinated. Mixtures of two or more of cyclic sulfates may also be used. Suitable cyclic sulfates include ethylene sulfate (1,3,2-dioxathiolane, 2,2-dioxide), 1,3,2-dioxathiolane, 4-ethynyl-, 2,2-dioxide, 1,3,2-dioxathiolane, 4-ethenyl-, 2,2-dioxide, 1,3,2-dioxathiolane, diethenyl-, 2,2-dioxide, 1,3,2-dioxathiolane, 4-methyl-, 2,2-dioxide, and 1,3,2-dioxathiolane, 4,5-dimethyl-, 2,2-dioxide. In one embodiment, the cyclic sulfate is ethylene sulfate. In one embodiment, the cyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 0.5 weight percent to about 2 weight percent, or about 2 weight percent to about 3 weight percent. In one embodiment the cyclic sulfate is present at about 1 weight percent to about 3 weight percent or about 1.5 weight percent to about 2.5 weight percent, or about 2 weight percent of the total electrolyte composition.

In some embodiments, the electrolyte composition further comprises a cyclic carboxylic acid anhydride. Suitable cyclic carboxylic acid anhydrides include those selected from the group consisting of the compounds represented by Formula (I) through Formula (VIII):

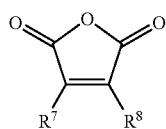

I

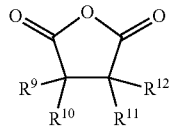

II

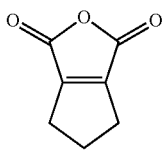

III

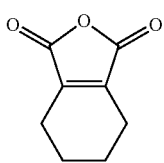

IV

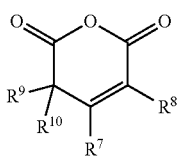

V

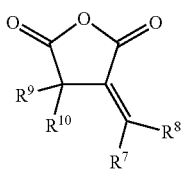

VI

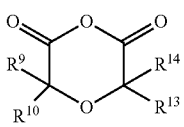

VII

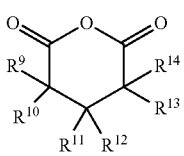

VIII wherein $R^7$ to $R^{14}$ is each independently H, F, a linear or branched $C_1$ to $C_{10}$ alkyl radical optionally substituted with F, alkoxy, and/or thioalkyl substituents, a linear or branched $C_2$ to $C_{10}$ alkene radical, or a $C_6$ to $C_{10}$ aryl radical. The alkoxy substituents can have from one to ten carbons and can be linear or branched; examples of alkoxy substituents include —$OCH_3$, —$OCH_2CH_3$, and —$OCH_2CH_2CH_3$. The thioalkyl substituents can have from one to ten carbons and can be linear or branched; examples of thioalkyl substituents include —$SCH_3$, —$SCH_2CH_3$, and —$SCH_2CH_2CH_3$. Examples of suitable cyclic carboxylic acid anhydrides include maleic anhydride; succinic anhydride; glutaric anhydride; 2,3-dimethylmaleic anhydride; citraconic anhydride; 1-cyclopentene-1,2-dicarboxylic anhydride; 2,3-diphenylmaleic anhydride; 3,4,5,6-tetrahydrophthalic anhydride; 2,3-dihydro-1,4-dithiiono-[2,3-c] furan-5,7-dione; and phenylmaleic anhydride. A mixture of two or more of these cyclic carboxylic acid anhydrides can also be used. In one embodiment, the cyclic carboxylic acid anhydride comprises maleic anhydride. In one embodiment, the cyclic carboxylic acid anhydride comprises maleic anhydride, succinic anhydride, glutaric anhydride, 2,3-dimethylmaleic anhydride, citraconic anhydride, or mixtures thereof. Cyclic carboxylic acid anhydrides can be obtained from a specialty chemical company such as Sigma-Aldrich, Inc. (Milwaukee, Wis.), or prepared using methods known in the art. It is desirable to purify the cyclic carboxylic acid anhydride to a purity level of at least about 99.0%, for example at least about 99.9%. Purification can be done using methods known in the art.

In some embodiments, the electrolyte composition comprises about 0.1 weight percent to about 5 weight percent of the cyclic carboxylic acid anhydride, based on the total weight of the electrolyte composition. In some embodiments, the cyclic carboxylic acid anhydride is present in the electrolyte composition in a percentage by weight that is defined by a lower limit and an upper limit. The lower limit of the range is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 and the upper limit of the range is 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. All percentages by weight are based on the total weight of the electrolyte composition.

In some embodiments, the electrolyte composition further comprises a heterocyclic sulfate containing a six-membered ring or a higher-membered ring. Suitable heterocyclic sulfates include those compounds represented by Formula (IX):

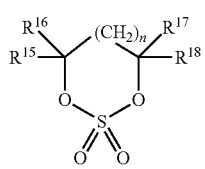

IX wherein $R^{15}$ to $R^{18}$ each independently represent hydrogen, halogen, a $C_1$ to $C_{12}$ alkyl group, or a $C_1$ to $C_{12}$ fluoroalkyl group, and n has a value of 1, 2, or 3. An example of a suitable heterocyclic sulfate is 1,3-propylene sulfate, in n=1 and each of $R^{15}$, $R^{16}$, $R^{17}$, and $R^{18}$ is H. In one embodiment, the heterocyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 1.0 weight percent to about 2 weight percent. In one embodiment the heterocyclic sulfate is present at about 1 weight percent to about 3 weight percent or about 1.5 weight percent to about 2.5 weight percent, or about 2 weight percent of the total electrolyte composition.

In one embodiment, the electrolyte composition comprises fluoroethylene carbonate, ethyl methyl carbonate, and 5 weight percent or less of 2,2-difluoroethyl acetate. In one embodiment, the electrolyte composition comprises fluoroethylene carbonate, diethyl carbonate, and 5 weight percent or less of 2,2-difluoroethyl acetate. In one embodiment, the electrolyte composition comprises propylene carbonate, ethyl methyl carbonate, and 5 weight percent or less of 2,2-difluoroethyl acetate. In one embodiment, the electrolyte composition comprises propylene carbonate, diethyl carbonate, and 5 weight percent or less of 2,2-difluoroethyl acetate. In one embodiment, the electrolyte composition comprises fluoroethylene carbonate, propylene carbonate, ethyl methyl carbonate, and 5 weight percent or less of 2,2-difluoroethyl acetate. In one embodiment, the electrolyte composition comprises fluoroethylene carbonate, propylene carbonate, diethyl carbonate, and 5 weight percent or less of 2,2-difluoroethyl acetate. In one embodiment, the electrolyte composition comprises fluoroethylene carbonate, propylene carbonate, ethyl methyl carbonate, diethyl carbonate, and 5 weight percent or less of 2,2-difluoroethyl acetate. In one embodiment, the electrolyte composition comprises fluoroethylene carbonate, propylene carbonate, ethyl methyl carbonate, diethyl carbonate, 5 weight percent or less of 2,2-difluoroethyl acetate, bis(oxalato)borate, ethylene sulfate, and maleic anhydride. In one embodiment, the electrolyte composition comprises fluoroethylene carbonate, propylene carbonate, ethyl methyl carbonate, diethyl carbonate, 5 weight percent or less of 2,2-difluoroethyl acetate, and lithium bis(fluorosulfonyl)imide.

In one embodiment, the electrolyte composition comprises fluoroethylene carbonate, ethyl methyl carbonate, and 5 weight percent or less of 2,2-difluoroethyl propionate. In one embodiment, the electrolyte composition comprises fluoroethylene carbonate, diethyl carbonate, and 5 weight percent or less of 2,2-difluoroethyl propionate. In one embodiment, the electrolyte composition comprises propylene carbonate, ethyl methyl carbonate, and 5 weight percent or less of 2,2-difluoroethyl propionate. In one embodiment, the electrolyte composition comprises propylene carbonate, diethyl carbonate, and 5 weight percent or less of 2,2-difluoroethyl propionate. In one embodiment, the electrolyte composition comprises fluoroethylene carbonate, propylene carbonate, ethyl methyl carbonate, and 5 weight percent or less of 2,2-difluoroethyl propionate. In one embodiment, the electrolyte composition comprises fluoroethylene carbonate, propylene carbonate, diethyl carbonate, and 5 weight percent or less of 2,2-difluoroethyl propionate.

In one embodiment, the electrolyte composition comprises fluoroethylene carbonate, ethyl methyl carbonate, and 5 weight percent or less of 2,2,2-trifluoroethyl acetate. In one embodiment, the electrolyte composition comprises fluoroethylene carbonate, diethyl carbonate, and 5 weight percent or less of 2,2,2-trifluoroethyl acetate. In one embodiment, the electrolyte composition comprises propylene carbonate, ethyl methyl carbonate, and 5 weight percent or less of 2,2,2-trifluoroethyl acetate. In one embodiment, the electrolyte composition comprises propylene carbonate, diethyl carbonate, and 5 weight percent or less of 2,2,2-trifluoroethyl acetate. In one embodiment, the electrolyte composition comprises fluoroethylene carbonate, propylene carbonate, ethyl methyl carbonate, and 5 weight percent or less of 2,2,2-trifluoroethyl acetate. In one embodiment, the electrolyte composition comprises fluoroethylene carbonate, propylene carbonate, diethyl carbonate, and 5 weight percent or less of 2,2,2-trifluoroethyl acetate.

In one embodiment, the electrolyte composition comprises fluoroethylene carbonate, ethyl methyl carbonate, and 5 weight percent or less of 2,2-difluoroethyl methyl carbonate. In one embodiment, the electrolyte composition comprises fluoroethylene carbonate, diethyl carbonate, and 5 weight percent or less of 2,2-difluoroethyl methyl carbonate. In one embodiment, the electrolyte composition comprises propylene carbonate, ethyl methyl carbonate, and 5 weight percent or less of 2,2-difluoroethyl methyl carbonate. In one embodiment, the electrolyte composition comprises propylene carbonate, diethyl carbonate, and 5 weight percent or less of 2,2-difluoroethyl methyl carbonate. In one embodiment, the electrolyte composition comprises fluoroethylene carbonate, propylene carbonate, ethyl methyl carbonate, and 5 weight percent or less of 2,2-difluoroethyl methyl carbonate. In one embodiment, the electrolyte composition comprises fluoroethylene carbonate, propylene carbonate, diethyl carbonate, and 5 weight percent or less of 2,2-difluoroethyl methyl carbonate.

In one embodiment, the electrolyte composition comprises fluoroethylene carbonate, ethyl methyl carbonate, and 5 weight percent or less of 2,2-difluoroethyl ethyl carbonate. In one embodiment, the electrolyte composition comprises fluoroethylene carbonate, diethyl carbonate, and 5 weight percent or less of 2,2-difluoroethyl ethyl carbonate. In one embodiment, the electrolyte composition comprises propylene carbonate, ethyl methyl carbonate, and 5 weight percent or less of 2,2-difluoroethyl ethyl carbonate. In one embodiment, the electrolyte composition comprises propylene carbonate, diethyl carbonate, and 5 weight percent or less of 2,2-difluoroethyl ethyl carbonate. In one embodiment, the electrolyte composition comprises fluoroethylene carbonate, propylene carbonate, ethyl methyl carbonate, and 5 weight percent or less of 2,2-difluoroethyl ethyl carbonate. In one embodiment, the electrolyte composition comprises fluoroethylene carbonate, propylene carbonate, diethyl carbonate, and 5 weight percent or less of 2,2-difluoroethyl ethyl carbonate. In one embodiment, the electrolyte composition comprises fluoroethylene carbonate, propylene carbonate, ethyl methyl carbonate, diethyl carbonate, and 5 weight percent or less of 2,2-difluoroethyl ethyl carbonate.

In one embodiment, the electrolyte composition comprises fluoroethylene carbonate, ethyl methyl carbonate, and 5 weight percent or less of 2,2,2-trifluoroethyl methyl carbonate. In one embodiment, the electrolyte composition comprises fluoroethylene carbonate, diethyl carbonate, and 5 weight percent or less of 2,2,2-trifluoroethyl methyl carbonate. In one embodiment, the electrolyte composition comprises propylene carbonate, ethyl methyl carbonate, and 5 weight percent or less of 2,2,2-trifluoroethyl methyl carbonate. In one embodiment, the electrolyte composition comprises propylene carbonate, diethyl carbonate, and 5 weight percent or less of 2,2,2-trifluoroethyl methyl carbonate. In one embodiment, the electrolyte composition comprises fluoroethylene carbonate, propylene carbonate, ethyl methyl carbonate, and 5 weight percent or less of 2,2,2-trifluoroethyl methyl carbonate. In one embodiment, the electrolyte composition comprises fluoroethylene carbonate, propylene carbonate, diethyl carbonate, and 5 weight percent or less of 2,2,2-trifluoroethyl methyl carbonate.

Optionally, the electrolyte compositions disclosed herein can further comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight % to about 10 weight %, alternatively from about 0.05 weight % to about 5 weight % of the electrolyte composition, or alternatively from about 0.5 weight % to about 2 weight % of the electrolyte composition.

Suitable gas-reduction additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-I,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene;

benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis (vinylsulfonyl)-methane; 1,3-bis(ethenylsulfonyl)-propane; 1,2-bis(ethenylsulfonyl)-ethane; ethylene carbonate; diethyl carbonate; dimethyl carbonate; ethyl methyl carbonate; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid lithium oxalate, $B_2O_5$, ZnO, and fluorinated inorganic salts.

In another embodiment, there is provided herein an electrochemical cell comprising a housing, an anode and a cathode disposed in the housing and in ionically conductive contact with one another, an electrolyte composition as described herein above disposed in the housing and providing an ionically conductive pathway between the anode and the cathode, and a porous separator between the anode and the cathode. In some embodiments, the electrochemical cell is a lithium ion battery.

In some embodiments, the electrolyte component of the electrolyte composition disposed in the housing comprises a fluorinated acyclic carboxylic acid ester, and the fluorinated acyclic carboxylic acid ester comprises $CH_3$—COO—$CH_2CF_2H$, $CH_3CH_2$—COO—$CH_2CF_2H$, $F_2CHCH_2$—COO—$CH_3$, $F_2CHCH_2$—COO—$CH_2CH_3$, $CH_3$—COO—$CH_2CH_2CF_3$, $CH_3CH_2$—COO—$CH_2CH_2CF_2H$, $F_2CHCH_2CH_2$—COO—$CH_2CH_3$, $CH_3$—COO—$CH_2CF_3$, $CH_3CH_2$—COO—$CH_2CF_2H$, $CH_3$—COO—$CH_2CF_3$, H_COO—$CH_2CF_2H$, H—COO—$CH_2CF_3$, or mixtures thereof.

In some embodiments, the electrolyte component of the electrolyte composition disposed in the housing comprises a fluorinated acyclic carbonate, and the fluorinated acyclic carbonate comprises $CH_3$—OC(O)O—$CH_2CF_2H$, $CH_3$—OC(O)O—$CH_2CF_3$, $CH_3$—OC(O)O—$CH_2CF_2CF_2H$, $HCF_2CH_2$—OCOO—$CH_2CH_3$, $CF_3CH_2$—OCOO—$CH_2CH_3$, or mixtures thereof.

In some embodiments, the electrolyte component of the electrolyte composition disposed in the housing comprises a fluorinated acyclic ether, and the fluorinated acyclic ether comprises $HCF_2CF_2CH_2$—O—$CF_2CF_2H$ or $HCF_2CH_2$—O—$CF_2CF_2H$.

The housing may be any suitable container to house the electrochemical cell components. Housing materials are well-known in the art and can include, for example, metal and polymeric housings. While the shape of the housing is not particularly important, suitable housings can be fabricated in the shape of a small or large cylinder, a prismatic case, or a pouch. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, polyamide, polyimide or a combination thereof. The pore size of the porous separator is sufficiently large to permit transport of ions to provide ionically conductive contact between the anode and the cathode, but small enough to prevent contact of the anode and cathode either directly or from particle penetration or dendrites which can form on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525).

Many different types of materials are known that can function as the anode or the cathode. In some embodiments, the cathode can include, for example, cathode electroactive materials comprising lithium and transition metals, such as $LiCoO_2$, $LiNiO_2$, $LiMn_2O_4$, $LiCo_{0.2}Ni_{0.2}O_2$, $LiV_3O_8$, $LiNi_{0.5}Mn_{1.5}O_4$; $LiFePO_4$, $LiMnPO_4$, $LiCoPO_4$, and $LiVPO_4F$. In other embodiments, the cathode active materials can include, for example:

$Li_aCoG_bO_2$ (0.90≤a≤1.8, and 0.001≤b≤0.1);

$Li_aNi_bMn_cCo_dR_eO_{2-f}Z_f$ where 0.8≤a≤1.2, 0.1≤b≤0.9, 0.0≤c≤0.7, 0.05≤d≤0.4, 0≤e≤0.2, wherein the sum of b+c+d+e is about 1, and 0≤f≤0.08;

$Li_aA_{1-b}R_bD_2$ (0.90≤a≤1.8 and 0≤b≤0.5);

$Li_aE_{1-b}R_bO_{2-c}D_c$ (0.90≤a≤1.8, 0≤b≤0.5 and 0≤c≤0.05);

$Li_aNi_{1-b-c}Co_bR_cO_{2-d}Z_d$ where 0.9≤a≤1.8, 0≤b≤0.4, 0≤c≤0.05, and 0≤d≤0.05;

$Li_{1+z}Ni_{1-x-y}Co_xAl_yO_2$ where 0<x<0.3, 0<y<0.1, and 0<z<0.06.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc.

In another embodiment, the cathode material is an NMC cathode; that is, a LiNiMnCoO cathode, more specifically, cathodes in which the atomic ratio of Ni:Mn:Co is 1:1:1 ($Li_aNi_{1-b-c}Co_bR_cO_{2-d}Z_d$ where 0.98≤a≤1.05, 0≤d≤0.05, b=0.333, c=0.333, where R comprises Mn) or where the atomic ratio of Ni:Mn:Co is 5:3:2 ($Li_aNi_{1-b-c}Co_bR_cO_{2-d}Z_d$ where 0.98≤a≤1.05, 0≤d≤0.05, c=0.3, b=0.2, where R comprises Mn).

In another embodiment, the cathode comprises a material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and $0.9 \leq a \leq 1.2$, $1.3 \leq b \leq 2.2$, $0 \leq c \leq 0.7$, $0 \leq d \leq 0.4$.

In another embodiment, the cathode in the electrochemical cell or lithium ion battery disclosed herein comprises a cathode active material exhibiting greater than 30 mAh/g capacity in the potential range greater than 4.6 V versus a Li/Li$^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode comprises a composite material represented by the structure of Formula:

$$x(Li_{2-w}A_{1-v}Q_{w+v}O_{3-e}) \cdot ((1-x)(Li_yMn_{2-z}M_zO_{4-d})$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In another embodiment, in the Formula $$x(Li_{2-w}A_{1-v}Q_{w+v}O_{3-e}) \cdot (1-x)(Li_yMn_{2-z}M_zO_{4-d})$$

x is about 0 to about 0.1, and all ranges for the other variables are as stated herein above.

In another embodiment, the cathode in the lithium ion battery disclosed herein comprises $$Li_aA_{1-x}R_xDO_{4-f}Z_f$$

wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

In another embodiment, the cathode in the lithium ion battery ore electrochemical cell disclosed herein comprises a cathode active material which is charged to a potential greater than or equal to about 4.1 V, or greater than or equal to 4.35 V, or greater than 4.5 V, or greater than or equal to 4.6 V versus a Li/Li$^+$ reference electrode. Other examples are layered-layered high-capacity oxygen-release cathodes such as those described in U.S. Pat. No. 7,468,223 charged to upper charging potentials above 4.5 V.

In some embodiments, the cathode comprises a cathode active material exhibiting greater than 30 mAh/g capacity in the potential range greater than 4.6 V versus a Li/Li$^+$ reference electrode, or a cathode active material which is charged to a potential greater than or equal to 4.35 V versus a Li/Li$^+$ reference electrode.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH.H$_2$O at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

An electrochemical cell or lithium ion battery as disclosed herein further contains an anode, which comprises an anode active material that is capable of storing and releasing lithium ions. Examples of suitable anode active materials include, for example, lithium alloys such as lithium-aluminum alloy, lithium-lead alloy, lithium-silicon alloy, and lithium-tin alloy; carbon materials such as graphite and mesocarbon microbeads (MCMB); phosphorus-containing materials such as black phosphorus, MnP$_4$ and CoP$_3$; metal oxides such as SnO$_2$, SnO and TiO$_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as Li$_4$Ti$_5$O$_{12}$ and LiTi$_2$O$_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi, NEI Inc. (Somerset, N.J.), and Farasis Energy Inc. (Hayward, Calif.).

The electrochemical cell as disclosed herein can be used in a variety of applications. For example, the electrochemical cell can be used for grid storage or as a power source in various electronically powered or assisted devices ("Electronic Device") such as a computer, a camera, a radio, a power tool, a telecommunications device, or a transportation device (including a motor vehicle, automobile, truck, bus or airplane). The present disclosure also relates to an electronic device, a transportation device, or a telecommunication device comprising the disclosed electrochemical cell.

In another embodiment, there is provided a method for forming an electrolyte composition. The method comprises combining a) a first solvent comprising a cyclic carbonate; b) a second solvent comprising a non-fluorinated acyclic carbonate; c) at least one electrolyte component selected from i) a fluorinated acyclic carboxylic acid ester; ii) a fluorinated acyclic carbonate; iii) a fluorinated acyclic ether; iv) or a mixture thereof; and d) an electrolyte salt to form the electrolyte composition. The components can be combined in any suitable order. The step of combining can be accomplished by adding the individual components of the electrolyte composition sequentially or at the same time. In some embodiments, the components a) and b) are combined to make a first solution. After the formation of the first solution, an amount of the electrolyte salt is added to the first solution in order to produce the electrolyte composition having the desired concentration of electrolyte salt, and then the desired amount of the electrolyte component is added. Alternatively, after the formation of the first solution, the desired amount of the electrolyte component is added, followed by the desired amount of the electrolyte salt. Alternatively, the components a) and c), or b) and c), are combined to make a first solution, and after the formation of the first solution the remaining components are added to produce the electrolyte composition. Typically, the electrolyte composition is stirred during and/or after the addition of the components in order to form a homogeneous mixture.

EXAMPLES

The concepts disclosed herein are illustrated in the following Examples, which are not intended to be used or interpreted as a limitation of the scope of the claims unless this intention is expressly stated. From the above discussion and these Examples, one skilled in the art can ascertain the essential characteristics of the concepts disclosed herein, and without departing from the spirit and scope thereof, can make various changes and modifications to adapt to various uses and conditions.

The meaning of abbreviations used is as follows: "° C." means degrees Celsius; "g" means gram(s), "mg" means milligram(s), "µg" means microgram(s), "L" means liter(s), "mL" means milliliter(s), "µL" means microliter(s), "mol" means mole(s), "mmol" means millimole(s), "M" means molar concentration, "wt %" means percent by weight, "mm" means millimeter(s), "µm" means micrometer(s), "ppm" means parts per million, "h" means hour(s), "min" means minute(s), "psig" means pounds per square inch gauge, "kPa" means kiloPascal(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "NMR" means nuclear magnetic resonance spectroscopy, "GC/MS" means gas chromatography/mass spectrometry, "Ex" means Example and "Comp. Ex" means Comparative Example.

Materials and Methods

Representative preparation of 2,2-difluoroethyl acetate (DFEA)

The 2,2-difluoroethyl acetate used in the Examples and Comparative Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent 19091S-433, 30 m, 250 µm, 0.25 µm; carrier gas—He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3A molecular sieves, until water was not detectable by Karl Fischer titration (i.e., <1 ppm).

Synthesis of 2,2-Difluoroethyl Methyl Carbonate (DFEMC)

A solution of 404 mL 2,2-difluoroethanol (DFE; 525 g; 6.40 mol; mw=82.05; D=1.30; bp=95° C.; Synquest 2101-3-02) and 11.6 g 4-(dimethylamino)pyridine (DMAP; 94.9 mmol; 1.5 mol %; mw=122.17; Aldrich 107700) in 4644 mL dichloromethane (DCM) was cooled via a circulating chiller as it stirred under nitrogen in a 20-L jacketed flask with bottom let-down valve, a condenser, overhead stirrer and a dropping funnel. Aqueous NaOH (441 mL; 50 wt % NaOH; 8.3 mol; 30% excess; 0.75 g NaOH/mL; 18.8 M; D=1.52; Aldrich 415413) was added all at once and the mixture was stirred and chilled to 1° C. The mixture was stirred rapidly as 584 mL cold methyl chloroformate (MCF, 712 g; 7.54 mol; 18% excess; mw=94.50; D=1.22; bp=70° C., Aldrich M35304) was added at 5-10 mL/min. The chiller was set at −20° C. to maintain the reaction temperature at 2-3° C. After about half the MCF had been added, the salts in the aqueous phase crystallized and, in the absence of liquid aqueous NaOH, the reaction essentially stopped. Water (300 mL) was added to liquify the salts and the reaction proceeded again. When the MCF had all been added (1.5 hr total addition time), the dichloromethane solution was sampled and analyzed by gas chromatography (30-m DB-5; 30° C./5 min, then 10° C./min; He: 13.8 cc/min): 0.97 min (0.006%, DFE); 1.10 min (61.019%, DCM); 1.92 min (0.408%, dimethyl carbonate, DMC); 4.38 min (38.464%, 2,2-difluoroethyl methyl carbonate, DFEMC). DFEMC:DFE=6410; DFEMC: DMC=94. The dichloromethane product solution was drawn off via the bottom valve and the flask was washed out with water; the dichloromethane solution was then returned to the flask and was stirred sequentially with 2×750 mL 5% hydrochloric acid followed by 1.5 L sat sodium bicarbonate and finally dried with magnesium sulfate.

The dichloromethane was distilled off at ~40° C./500 torr from a 5-L flask through a 12" empty column topped with a simple still head. Then the residual pot material was distilled at 100°/250 torr to yield 866 g crude 2,2-difluoroethyl methyl carbonate; GC analysis showed DFE 0.011%; DCM 4.733%; DMC 0.646%; DFEMC 94.568%; bis(2,2-difluoroethyl) carbonate (BDFEC) 0.043%. This is a 91% yield of 2,2-difluoroethyl methyl carbonate. The crude DFEMC was redistilled from a 95-113° bath at 285 torr through an 18" glass column packed with 0.16-in SS316 mesh saddles. Fractions 7-10 distilled at about 90° C./285 torr from a 105-113° C. bath. GC-FID analysis of these fractions is provided in Table 1. The pot (25 g) was mostly BDFEC.

TABLE 1

Distillation Fraction Composition by GC-FID Analysis

| Fraction | DFE % | DMC % | DFEMC % | BDFEC % | Yield, g |
|---|---|---|---|---|---|
| 7 | 0.0089 | 0.8403 | 99.0496 | 0.0500 | 501 |
| 8 | 0.0019 | 0.0023 | 99.9283 | 0.0522 | 128 |
| 9 | 0.0094 | 0.0300 | 99.3358 | 0.5787 | 61 |
| 10 | 0.0110 | — | 99.0150 | 0.9240 | 11 |

Fractions 7-9 were combined and distilled under partial vacuum (70 torr) from a 100° C. oil bath through a 20-cm x 2.2 cm column packed with 0.16-in SS316 mesh saddles (Ace Glass 6624-04) in four fractions: #1 (23 g), #2 (20 g), #3 (16 g) and #4 (13 g), to remove DFE. The DFE content of the distillates was analyzed by GC: #1 (0.100%), #2 (0.059%), #3 (0.035%) and #4 (0.026%). The pot material (602 g) was analyzed by GC-FID: DFE 0.0016%; DMC 0.1806%; DFEMC 99.6868%; BDFEC 0.1132%. The sum of DMC, DFEMC and BDFEC accounted for 99.9808% of the product, which contained 16 ppm DFE. The product also contained 18 ppm water by Karl-Fischer titration.

Lithium Bis(Oxalato)Borate (LiBOB) Purification

In a nitrogen purged dry box, lithium bis(oxalato)borate (LiBOB, Sigma Aldrich, 757136-25G) was purified using the following procedure. 25 grams of LiBOB were added to a 500 mL Erlenmeyer flask equipped with a Teflon-coated stir bar. To this, 125 mL of anhydrous acetonitrile (Sigma Aldrich, Fluka, molecular sieves) was added. The flask was heated at 45° C. for 10 minutes using an oil bath. The mixture was filtered through a fine-pore glass frit (Chemglass, F, 60 mL) into a 500 mL filter flask with the use of vacuum. The solution was allowed to cool to room temperature, forming a clear solution, and 125 mL of cold toluene (Freezer @ −25° C., Sigma Aldrich CHROMASOLV®) was added. Immediate precipitation was observed and this mixture was allowed to sit for 20 minutes to allow additional solid formation. The solution was filtered through a fine-pore glass frit (Chemglass, F, 60 mL) into a 500 mL round bottom. The filter cake was washed with cold anhydrous toluene (2× 20 mL) and using a glass funnel, transferred to a cylindrical long neck flask. This flask was capped tightly, removed from the glove box, and attached to a Kugelrohr, which was subsequently attached to a high vacuum. This flask was dried under high vacuum (60-100 millitorr) at room temperature overnight, and then at 140° C. under high vacuum (60-80 millitorr) for an additional three days. At this time, the flask was capped and returned to the dry box for further purification. Propylene carbonate was used to further purify the LiBOB, as described below.

Propylene Carbonate Purification (Used to Purify LiBOB Further)

Propylene carbonate (PC, Aldrich, CHROMASOLV for HPLC, 99.7%) was transferred to the dry box and placed on activated molecular sieves to dry the solvent. 300 mL PC was added to a round bottom flask with a stir bar. This was attached to a single piece distillation apparatus with a Vigreux column. The apparatus was then put under high vacuum (~500 millitorr), and the solution was degassed with stirring. The temperature was then increased to 50° C., and then 90° C. Eventually, the vacuum increased to ~250 millitorr, and the PC fraction began to distill over. Seven fractions were collected. The last two fractions (totaling ~290 mL) were used in subsequent steps.

A sacrificial portion of LiBOB was used to trap any remaining impurities in the fractionally distilled propylene carbonate. 10.2 g of LiBOB (Rockwood Lithium, Frankfurt, Germany) was combined with 200 mL of the distilled PC. This was stirred overnight in the dry box, at 100° C. The mixture was then attached to a simple distillation apparatus, and the PC was distilled off and collected into a round bottom flask. A heat gun was used multiple times to help the PC distill over. This propylene carbonate which was collected was then transferred to the dry box and used to purify LiBOB.

In the glove box, to a 250 mL round bottom equipped with a Teflon coated stir bar, 17 g of LiBOB (previously purified using acetonitrile and toluene, as described above) and 75 mL of purified propylene carbonate were added. This was stirred at room temperature in the glove box for ~2 hours. If the solution was not clear, the temperature was increased to 60° C. and stirred for ~15 minutes.

This tubing was then attached to a simple distillation apparatus. The distillation apparatus was sealed using a receiver round bottom and clamped rubber tubing. The apparatus was then removed from the dry box. The rubber tubing was attached to the schlenk line/high vacuum, and the apparatus was put under vacuum (~150 millitorr). The receiver flask was surrounded by a dry ice/acetone trap, and the LiBOB/PC flask was heated in an oil bath (55-70° C.). The temperature was adjusted based on the efficiency of the high vacuum. If the temperature is too high, the LiBOB will start to collect in the top of the distillation head. After most of the PC was removed, a heat gun was used to help droplets move from the distillation head. This was repeated until no droplets appeared. The dry ice/acetone receiver trap was then replaced by a liquid nitrogen trap, and the oil bath temperature was slowly increased to 115-130° C. (again depending on the vacuum). A heat gun was again used to remove droplets of PC in the distillation head. This was repeated until no more PC was being removed.

The apparatus was then removed from heat/liquid nitrogen and placed under nitrogen. After the LiBOB had cooled, and the PC had warmed to room temperature, the apparatus tubing was clamped using forceps to keep it under nitrogen. It was then transferred to the dry box by purging the antechamber with a continuous flow of nitrogen for ~20 minutes.

Ethylene Sulfate (ES) Purification

In a glove box, 12 g of ethylene sulfate (Chemlmpex, Wood Dale, Ill.) was added to a sublimator equipped with an insert for dry ice/acetone. This was sealed in the dry box, removed, and attached to the high vacuum (~100 millitorr). The tubing was first put under vacuum before the valve was opened to put the sublimator under vacuum. The insert was filled with dry ice and acetone and the bottom of the sublimator was submerged in an oil bath, preheated to 60° C. This was heated for ~4 hours, or until all of the white solid adhered to the cold finger. At this time, the valve was sealed to keep the contents under vacuum. The tubing was put under nitrogen and removed. The dry ice/acetone trapped was then emptied, and the outside of the sublimator was cleaned off. This was transferred into the glove box, and the white solid was collected into a dried glass container using a plastic funnel. An NMR of the sublimed ES in $CDCl_3$ was then obtained to confirm its purity. The purified ES was stored in a glass container in the freezer until needed.

Maleic Anhydride (MA) Purification

In the glove box, 27 g of maleic anhydride (Aldrich, Milwaukee, Wis.)) was added to a large sublimator equipped with an insert for dry ice/acetone. This was sealed in the dry box, removed, and attached to the high vacuum (~100 millitorr). The tubing was first put under vacuum before the valve was opened to evacuate the sublimator. The insert was filled with dry ice and acetone and the bottom of the sublimator was submerged in an oil bath, preheated to 60° C. This was heated for one hour, and then the temperature was increased to 85° C. for another 7 hours, or until all of the sublimed white solid adhered to the cold finger. At this time, the valve was sealed to keep the contents under vacuum. The tubing was put under nitrogen and removed. The material in the dry ice/acetone trap was then emptied, and the outside of the sublimator was cleaned off. This was transferred into the glove box, and the white solid was collected into a dried glass container using a plastic funnel. An NMR of the MA in $CDCl_3$ was then obtained to verify its purity. The purified MA was stored in a glass container in the dry box until needed.

Electrolyte Preparation

For Example 1, the electrolyte composition was prepared as follows. Three stock solutions of diethyl carbonate (DEC), (BASF, Independence, Ohio) and ethyl methyl carbonate (EMC), (BASF, Independence, Ohio) with the following weights were prepared in a nitrogen purged dry box: 1) 13.848 g DEC and 36.158 g EMC, 2) 13.847 g DEC and 36.155 g EMC, and 3) 13.848 g DEC and 36.162 g EMC. Molecular sieves (3 A) were added and the mixtures was dried to less than 1 ppm water and filtered through a 0.25 micron PTFE syringe filter.

Next, 113.200 g of the DEC/EMC mixtures described above were combined with 15.097 g of fluoroethylene carbonate (FEC), (BASF, Independence, Ohio) and 22.638 g of propylene carbonate (PC), (as received, BASF, Independence, Ohio) in a nitrogen-purged dry box. Molecular sieves (3 A) were added and the mixture was dried to less than 1 ppm water as determined by Karl Fischer titration and filtered through a 0.25 micron PTFE syringe filter.

Then, 9.0136 g of the DEC/EMC/FEC/PC mixture was combined with 0.1126 g of LiBOB and gently agitated overnight. 0.0568 g of MA, 0.5615 g of DFEA, and 1.3540 g of $LiPF_6$ (BASF, Independence, Ohio) were then added. The mixture was gently agitated to dissolve the components. A separate vial of 0.1688 g of ethylene sulfate (ES) was prepared, and the two were combined immediately before use to provide the electrolyte composition of Example 1.

For Comparative Example A, the electrolyte composition was prepared by combining 113.200 g of the EMC/DEC mixture described in Example 1 with 15.097 g of FEC and 22.638 g of propylene carbonate in a nitrogen purged dry box. Molecular sieves (3 A) were added and the mixture was dried to less than 1 ppm water and filtered through a 0.25 micron PTFE syringe filter. 9.0096 g of the mixture was combined with 0.1073 g of LiBOB and gently agitated overnight. 0.0543 g of MA and 1.3600 g of $LiPF_6$ were then added. The material was gently agitated to dissolve the components. A separate vial of 0.1602 g of ethylene sulfate was prepared, and the two components were combined immediately before use to provide the electrolyte composition of Comparative Example A.

For Example 2, the electrolyte composition was prepared using the same procedures as described in Example 1, but with the following differences. The electrolyte composition was prepared by combining 113.200 g of the EMC/DEC mixture described in Example 1 with 15.097 g of FEC and 22.638 g of propylene carbonate in a nitrogen purged dry box. Molecular sieves (3 A) were added and the mixture was dried to less than 1 ppm water and filtered through a 0.25 micron PTFE syringe filter. 9.0046 g of the mixture was combined with 0.1094 g of lithium bis(fluorosulfonyl)imide (LiFSI, Nippon Shokubai Co., LTD, Japan), 0.5501 g of $DFEA$, and 1.3602 g of $LiPF_6$. The material was gently agitated to dissolve the components and prepare the final electrolyte composition of Example 2.

For Comparative Example B, the electrolyte composition was prepared using the same procedures as described in Example 1, but with the following differences. The electrolyte was prepared by combining 113.200 g of the EMC/DEC mixture described in Example 1 with 15.097 g of FEC and 22.638 g of propylene carbonate in a nitrogen purged dry box. Molecular sieves (3 A) were added and the mixture was dried to less than 1 ppm water and filtered through a 0.25 micron PTFE syringe filter.

9.0033 g of the mixture was combined with 0.1059 g of lithium bis(fluorosulfonyl)imide (LiFSI, Nippon Shokubai Co., LTD, Japan) and 1.3600 g of $LiPF_6$. The material was gently agitated to dissolve the components and prepare the final electrolyte composition of Comparative Example B.

For Example 3, the electrolyte composition was prepared using the same procedures as described in Example 1, with the following differences. The electrolyte was prepared by combining 113.200 g of the EMC/DEC mixture described in Example 1 with 15.097 g of FEC and 22.638 g of propylene carbonate in a nitrogen purged dry box. Molecular sieves (3 A) were added and the mixture was dried to less than 1 ppm water and filtered through a 0.25 micron PTFE syringe filter. 9.0072 g of the mixture was combined with 0.5402 g of DFEA and 1.3606 g of LiPF$_6$ (BASF, Independence, Ohio). The material was gently agitated to dissolve the components and prepare the final electrolyte composition of Example 3.

For Example 4, the electrolyte composition was prepared using the same procedures as described in Example 1, with the following differences. 27.698 g of diethyl carbonate and 72.302 g of ethyl methyl carbonate were combined in a nitrogen purged dry box. Molecular sieves (3 A) were added and the mixtures was dried to less than 1 ppm water and filtered through a 0.25 micron PTFE syringe filter. The electrolyte was prepared by combining 56.566 g of the mixture described above with 7.553 g of FEC and 11.317 g of propylene carbonate in a nitrogen purged dry box. Molecular sieves (3 A) were added and the mixture was dried to less than 1 ppm water and filtered through a 0.25 micron PTFE syringe filter. 9.0030 g of the mixture was combined with 0.5489 g of 2,2-difluoroethyl methyl carbonate (DFEMC) and 1.3600 g of LiPF$_6$. The material was gently agitated to dissolve the components and prepare the final electrolyte composition of Example 4.

For Comparative Example C, the electrolyte composition was prepared using the same procedures as described in Example 4, except that 2,2-difluoroethyl methyl carbonate (DFEMC) was not added. Hence, 9.0525 g of the diethyl carbonate/ethyl methyl carbonate mixture, described in Example 4, was combined with 1.2077 g of FEC and 1.8134 g of propylene carbonate. 5.9985 g of this mixture was combined with 0.9062 g of LiPF$_6$.

For Example 5, the same procedures as described in Example 1 were used, with the following differences. 27.698 g of diethyl carbonate and 72.302 g of ethyl methyl carbonate were combined in a nitrogen purged dry box. Molecular sieves (3 A) were added and the mixtures was dried to less than 1 ppm water and filtered through a 0.25 micron PTFE syringe filter. The electrolyte was prepared by combining 56.566 g of the mixture described above with 7.553 g of fluoroethylene carbonate (FEC, BASF, Independence, Ohio) and 11.317 g of propylene carbonate (BASF, Independence, Ohio) in a nitrogen purged dry box. Molecular sieves (3 A) were added and the mixture was dried to less than 1 ppm water and filtered through a 0.25 micron PTFE syringe filter. 9.0003 g of the mixture was combined with 0.5444 g of DFEA and 1.3602 g of LiPF$_6$ (BASF, Independence, Ohio). The material was gently agitated to dissolve the components and prepare the final electrolyte composition of Example 5.

Pouch Cells

Pouch cells were purchased from Pred Materials (New York, N.Y.) and were 200 mAh cells containing an NMC 532 cathode and a graphitic anode.

Before use, the pouch cells were dried in the antechamber of a dry box under vacuum overnight at 80° C. Approximately 900 microliters of the desired electrolyte composition was injected through the bottom, and the bottom edge sealed in a vacuum sealer. For each Example and Comparative Example, two pouch cells were prepared using the same electrolyte composition.

Two different lots of pouch cells were used. Although nominally the same, the pouch cells of the two different lots appear to provide different electrochemical performance under the same conditions. For comparison purposes, the electrochemical results are compared for pouch cells of the same lot. Below, Table 2 presents results for one lot of pouch cells, and Table 3 for a second lot.

Pouch Cell Evaluation Procedure

The cells were placed in fixtures which applied a pressure of 66 kPa to the electrodes through an aluminum plate fitted with a foam pad. The cells were held in an environmental chamber (model BTU-433, Espec North America, Hudsonville, Mich.) and evaluated using a battery tester (Series 4000, Maccor, Tulsa, Okla.) for the formation procedures (at 25° C.) and the high temperature cycling (at 45° C.). In the following procedures, the currents for the C-rates were determined assuming the cell would have a capacity of 170 mAh per g of NMC. Thus currents of 0.05 C, 0.25 C, and 1.0 C were implemented in the tester using, respectively, currents of 8.5, 42.5, and 170 mA per gram of NMC in the cell.

The pouch cells were conditioned using the following cycling procedure. In a first cycle, the cell was charged for 36 min at 0.25 C, corresponding to approximately 15% state of charge; this was followed by a four hour rest at open circuit voltage. The first charge was continued using constant current (CC) of 0.25 C to 4.35 V. The cell was held at a constant voltage (CV) at 4.35 V until the current dropped below (or tapered off to) 0.05 C. This was followed by CC discharge at 0.5 C to 3.0 V.

For the second cycle, the cell was charged at constant current (CC charge) of 0.2 C to 4.35 V followed by a CV voltage-hold step at 4.35 V until current dropped below 0.05 C. This was followed by a CC discharge at 0.2 C to 3.0 V. This cycle was used as a check of the capacity of the cell.

Ten additional cycles were performed using 1 C—CCCV protocols which consisted of CC charges at 1 C to 4.35V, a CV constant voltage step where the current was allowed to taper to 0.05 C, followed by a discharge cycle at 1.0 C to 3.0 V.

For the 25° C. formation cycles and the 45° C. cycling described below, the cells also had a 10 min rest following each charge and each discharge step. Pressure (66 kPa) was applied to the cells during formation and cycling, and the cells were evacuated and resealed after the final discharge cycle.

Cycling Protocol

The cells were placed in an environmental chamber at 45° C. and cycled: CC charge 1 C to 4.35 V+CV charge to 0.05 C, and CC discharge at 1 C to 3.0 V.

Results for Examples 1-3 and Comparative Examples A and B are presented in Table 2, and results for Example 4 and Comparative Example C are presented in Table 3. In the Tables, the cycle life to 80% capacity retention is the number of cycles needed to reach 80% of the maximum capacity achieved during cycling at 45° C.

TABLE 2

| Example | Solvent Mixture [2] | Electrolyte Component [3] | Additives, Amount [4] (wt %) | Pouch Cell | Cycle Life to 80% Capacity Retention | Discharge Capacity at Cycle 10 (mAh/g) |
|---|---|---|---|---|---|---|
| | | Electrolyte Composition [1] | | | | |
| 1 | 10/15/54/21 FEC/PC/EMC/DEC | 5 wt % DFEA | 1 wt % LiBOB, 1.5 wt % ES, 0.5 wt % MA | 1-1 | 449 | 156 |
| | | | | 1-2 | 439 | 157 |

TABLE 2-continued

| Example | Solvent Mixture [2] | Electrolyte Component [3] | Additives, Amount [4] (wt %) | Pouch Cell | Cycle Life to 80% Capacity Retention | Discharge Capacity at Cycle 10 (mAh/g) |
|---|---|---|---|---|---|---|
| Comp. Ex. A | 10/15/54/21 FEC/PC/EMC/DEC | — | 1 wt % LiBOB, 1.5 wt % ES, 0.5 wt % MA | A-1 | 326 | 158 |
| | | | | A-2 | 330 | 163 |
| 2 | 10/15/54/21 FEC/PC/EMC/DEC | 5 wt % DFEA | 1 wt % LiFSi | 2-1 | 797 | 162 |
| | | | | 2-2 | 712 | 157 |
| Comp. Ex. B | 10/15/54/21 FEC/PC/EMC/DEC | — | 1 wt % LiFSi | B-1 | 700 | 161 |
| | | | | B-2 | 952 | 165 |
| 3 | 10/15/54/21 FEC/PC/EMC/DEC | 5 wt % DFEA | — | 3-1 | 754 | 162 |
| | | | | 3-2 | 968 | 161 |

Notes:
[1] All electrolyte compositions 1M in $LiPF_6$
[2] Solvent mixture given in weight ratios, based on solvents only
[3] Electrolyte component wt % based on total weight of solvent mixture
[4] Additive wt % based on total weight of solvent mixture The results in Table 2 show the beneficial effect of including an electrolyte component as disclosed herein in the electrolyte composition. Example 1, containing 5 wt % DFEA, shows improved cycle life to 80% capacity compared to Comparative Example A, which contains the same solvent mixture (in the same solvent ratios) and the same additives, except no DFEA. Hence, the effect of DFEA is to significantly improve the cycle life performance of the electrochemical cell.

Example 2 and Comparative Example B show the impact of LiFSI on cell performance, with and without DFEA. In either case, these two examples show very significantly superior cycle life capability compared with Comparative Example A, which does not contain DFEA and/or LiFSI.

TABLE 3

| Example | Solvent Mixture [2] | Electrolyte Component [3] | Cycle Life to 80% Capacity Retention | Discharge Capacity at Cycle 150 (mAh/g) | Discharge Capacity at Cycle 10 (mAh/g) | Coulombic Efficiency at Cycle 10 (%) |
|---|---|---|---|---|---|---|
| 4 | 10/15/54/21 FEC/PC/EMC/DEC | 5 wt % DFEMC | 643 | 173 | 187 | 99.84 |
| | | | 823 | 172 | 183 | 99.66 |
| Comp. Ex. C | 10/15/54/21 FEC/PC/EMC/DEC | — | N/A [4] | 152 | 164 | 99.83 |
| | | | N/A | 151 | 162 | 99.84 |
| 5 | 10/15/54/21 FEC/PC/EMC/DEC | 5 wt % DFEMC | N/A | 152 | 162 | 99.96 |
| | | | N/A | 152 | 162 | 99.80 |

Notes:
[1] All electrolyte compositions 1M in $LiPF_6$
[2] Solvent mixture given in weight ratios, based on solvents only
[3] Electrolyte component wt % based on total weight of solvent mixture
[4] N/A means not available Example 4 shows that electrolytes containing difluoroethyl methyl carbonate (DFEMC) show improvement in both the cycle life and the capacity retention (at ten cycles) compared to Comparative Example C, which does not contain the DFEMC component. Example 5 shows that electrolyte compositions containing difluoroethyl acetate (DFEA) show an improvement in coulombic efficiency (the ratio of the discharge capacity to charge capacity, which is an indication, at least in part, of the loss of cyclable Li and electrolyte degradation) at cycle 10 compared with that for Comparative Example C, which contained the same solvent mixture but no DFEA.

What is claimed is:

1. An electrolyte composition comprising:
 a) a first solvent comprising a cyclic carbonate, wherein the cyclic carbonate comprises 4-fluoroethylene carbonate;
 b) a second solvent comprising a non-fluorinated acyclic carbonate;
 c) at least one electrolyte component selected from
  i) a fluorinated acyclic carboxylic acid ester;
  ii) a fluorinated acyclic carbonate;
  iii) a fluorinated acyclic ether; or
  iv) a mixture thereof; and
 d) an electrolyte salt;
 wherein the first solvent comprising the cyclic carbonate is present in the electrolyte composition in the range of from 20 to 35 weight percent, based on the total weight of the first and second solvents;

wherein the second solvent comprising the non-fluorinated acyclic carbonate is present in the electrolyte composition in the range of from 65 to 80 weight percent, based on the total weight of the first and second solvents; and wherein the electrolyte component is present in the electrolyte composition in the range of from about 0.05 weight percent to about 10 weight percent, based on the total weight of the first and second solvents.

2. The electrolyte composition of claim 1, wherein the cyclic carbonate further comprises ethylene carbonate; propylene carbonate; vinylene carbonate; vinyl ethylene carbonate; dimethylvinylene carbonate; ethyl propyl vinylene carbonate; 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; or 4,4,5-trifluoro-1,3-dioxolan-2-one.

3. The electrolyte composition of claim 1, wherein the non-fluorinated acyclic carbonate comprises dimethyl carbonate, diethyl carbonate, dipropyl carbonate, dibutyl carbonate, or ethyl methyl carbonate.

4. The electrolyte composition of claim 1, wherein the electrolyte component comprises a fluorinated acyclic carboxylic acid ester represented by the formula:

$$R^1\text{—COO—}R^2,$$

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

5. The electrolyte composition of claim 4, wherein $R^1$ and $R^2$, taken as a pair, further comprise at least two fluorine atoms, with the proviso that neither $R^1$ nor $R^2$ contains a $FCH_2$— group or a —FCH— group.

6. The electrolyte composition of claim 4, wherein the fluorinated acyclic carboxylic acid ester comprises $CH_3$—COO—$CH_2CF_2H$, $CH_3CH_2$—COO—$CH_2CF_2H$, $F_2CHCH_2$—COO—$CH_3$, $F_2CHCH_2$—COO—$CH_2CH_3$, $CH_3$—COO—$CH_2CH_2CF_2H$, $CH_3CH_2$—COO—$CH_2CH_2CF_2H$, $F_2CHCH_2CH_2$—COO—$CH_2CH_3$, $CH_3$—COO—$CH_2CF_3$, $CH_3CH_2$—COO—$CH_2CF_2H$, $CH_3$—COO—$CH_2CF_3$, H—COO—$CH_2CF_2H$, H—COO—$CH_2CF_3$, or mixtures thereof.

7. The electrolyte composition of claim 6, wherein the fluorinated acyclic carboxylic acid ester comprises $CH_3$—COO—$CH_2CF_2H$.

8. The electrolyte composition of claim 7, further comprising lithium bis(oxalato)borate, ethylene sulfate, and maleic anhydride.

9. The electrolyte composition of claim 1, wherein the electrolyte component comprises a fluorinated acyclic carbonate represented by the formula:

$$R^3\text{—OCOO—}R^4,$$

wherein
i) $R^3$ is a fluoroalkyl group;
ii) $R^4$ is an alkyl group or a fluoroalkyl group;
iii) $R^3$ and $R^4$, taken as a pair, comprise at least two carbon atoms but not more than seven carbon atoms.

10. The electrolyte composition of claim 8, wherein $R^3$ and $R^4$, taken as a pair, further comprise at least two fluorine atoms, with the proviso that neither $R^3$ nor $R^4$ contains a $FCH_2$— group or a —FCH— group.

11. The electrolyte composition of claim 9, wherein the fluorinated acyclic carbonate comprises $CH_3$—OC(O)O—$CH_2CF_2H$, $CH_3$—OC(O)O—$CH_2CF_3$, $CH_3$—OC(O)O—$CH_2CF_2CF_2H$, $HCF_2CH_2$—OCOO—$CH_2CH_3$, $CF_3CH_2$—OCOO—$CH_2CH_3$, or mixtures thereof.

12. The electrolyte composition of claim 11, wherein the fluorinated acyclic carbonate comprises $CH_3$—OC(O)O—$CH_2CF_2H$.

13. The electrolyte composition of claim 1, wherein the electrolyte component comprises a fluorinated acyclic ether represented by the formula:

$$R^5\text{—O—}R^6,$$

wherein
i) $R^5$ is a fluoroalkyl group;
ii) $R^6$ is an alkyl group or a fluoroalkyl group;
iii) $R^5$ and $R^6$, taken as a pair, comprise at least two carbon atoms but not more than seven carbon atoms.

14. The electrolyte composition of claim 1, wherein the electrolyte component is present in the electrolyte composition in the range of from about 0.05 weight percent to about 5 weight percent, based on the total weight of the first and second solvents.

15. The electrolyte composition of claim 1, further comprising
an additive selected from a lithium boron compound, a cyclic sultone, a cyclic sulfate, a cyclic carboxylic acid anhydride, or a combination thereof.

16. The electrolyte composition of claim 15, wherein the electrolyte component comprises a fluorinated acyclic carboxylic acid ester represented by the formula:

$$R^1\text{—COO—}R^2,$$

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

17. An electrochemical cell comprising:
(a) a housing;
(b) an anode and a cathode disposed in the housing and in ionically conductive contact with one another;
(c) the electrolyte composition of claim 1 disposed in the housing and providing an ionically conductive pathway between the anode and the cathode; and
(d) a porous separator between the anode and the cathode.

18. The electrochemical cell of claim 17, wherein the electrochemical cell is a lithium ion battery.

19. The electrochemical cell of claim 18, wherein the cathode comprises a cathode active material exhibiting greater than 30 mAh/g capacity in the potential range greater than 4.6 V versus a $Li/Li^+$ reference electrode, or a cathode active material which is charged to a potential greater than or equal to 4.35 V versus a $Li/Li^+$ reference electrode.

20. The electrochemical cell of claim 18, wherein the cathode comprises:
a) a lithium-containing manganese composite oxide having a spinel structure as active material, the lithium-containing manganese composite oxide being represented by the formula:

$$Li_xNi_yM_zMn_{2-y-z}O_{4-d},$$

wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3; or b) a composite material represented by the structure of Formula:

$$x(Li_{2-w}A_{1-v}Q_{w+v}O_{3-e}) \cdot (1-x)(Li_yMn_{2-z}M_zO_{4-d})$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5 w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure; or c) $Li_aMn_bJ_cO_4Z_d$ wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and 0.9<a<1.2, 1.3<b<2.2, 0<c<0.7, 0<d<0.4, or d) $Li_aNi_bMn_cCo_dR_eO_{2-f}Z_f$,
wherein:
R is Al, Ni, Co, Mn, Cr, Fe, Mg, Sr, V, Zr, Ti, a rare earth element, or a combination thereof;
Z is F, S, P, or a combination thereof; and
0.8<a<1.2, 0.1<b<0.9, 0.0<c<0.7, 0.05<d<0.4, 0<e<0.2; wherein the sum of b+c+d+e is about 1; and 0<f<0.08; or e) $Li_aA_{1-b}R_bD_2$, wherein:
A is Ni, Co, Mn, or a combination thereof;
R is Al, Ni, Co, Mn, Cr, Fe, Mg, Sr, V, Zr, Ti, a rare earth element, or a combination thereof;
D is O, F, S, P, or a combination thereof; and
0.90<a<1.8 and 0<b<0.5.

21. The electrochemical cell of claim 18, wherein the cathode comprises $Li_aA_{1-x}R_xDO_{4-f}Z_f$,
wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
0.8<a<2.2;
0<x<0.3; and
0<f<0.1.

22. The electrochemical cell of claim 18, wherein the electrolyte component comprises a fluorinated acyclic carboxylic acid ester, and the fluorinated acyclic carboxylic acid ester comprises $CH_3$—COO—$CH_2CF_2H$, $CH_3CH_2$—COO—$CH_2CF_2H$, $F_2CHCH_2$—COO—$CH_3$, $F_2CHCH_2$—COO—$CH_2CH_3$, $CH_3$—COO—$CH_2CH_2CF_2H$, $CH_3CH_2$—COO—$CH_2CH_2CF_2H$, $F_2CHCH_2CH_2$—COO—$CH_2CH_3$, $CH_3$—COO—$CH_2CF_3$, $CH_3CH_2$—COO—$CH_2CF_2H$, $CH_3$—COO—$CH_2CF_3$, H—COO—$CH_2CF_2H$, H—COO—$CH_2CF_3$, or mixtures thereof.

23. The electrochemical cell of claim 18, wherein the electrolyte component comprises a fluorinated acyclic carbonate, and the fluorinated acyclic carbonate comprises $CH_3$—OC(O)O—$CH_2CF_2H$, $CH_3$—OC(O)O—$CH_2CF_3$, $CH_3$—OC(O)O—$CH_2CF_2CF_2H$, $HCF_2CH_2$—OCOO—$CH_2CH_3$, $CF_3CH_2$—OCOO—$CH_2CH_3$, or mixtures thereof.

24. An electronic device, transportation device, or telecommunications device, comprising an electrochemical cell according to claim 17.

* * * * *